Sept. 4, 1956  B. STACH  2,761,589
SEED SOWING MACHINE
Filed May 12, 1954
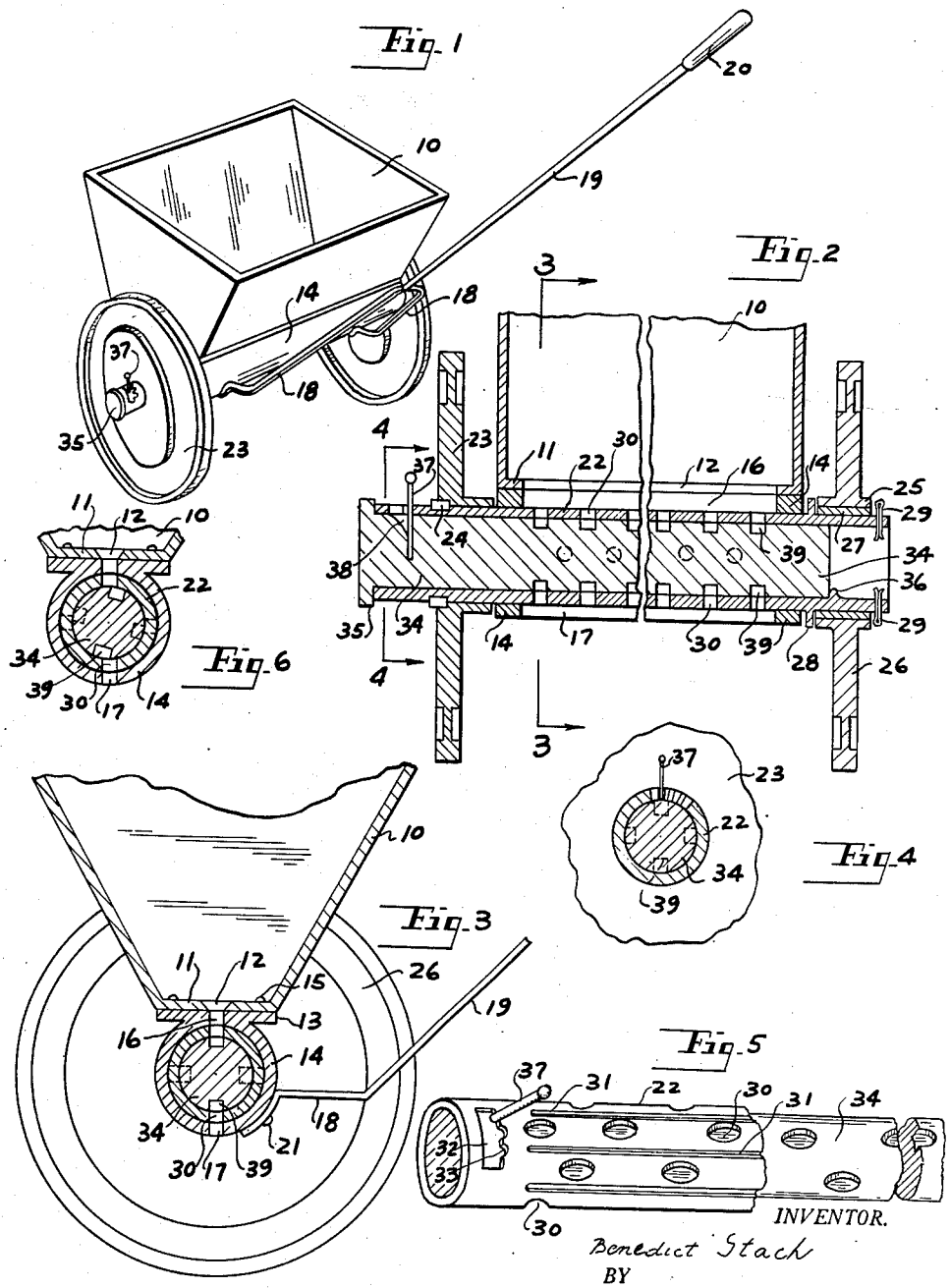
INVENTOR.
Benedict Stach
BY
Louis Chayka
ATTORNEY.

United States Patent Office 2,761,589
Patented Sept. 4, 1956

2,761,589

SEED SOWING MACHINE

Benedict Stach, Detroit, Mich.

Application May 12, 1954, Serial No. 429,172

3 Claims. (Cl. 222—177)

The invention described herein pertains to a hand-operated machine for use in gardens or on other smaller plots of ground, even though the principle disclosed herein could be also applied to larger machines for farm use.

The object of the invention is to provide a light and compact machine adapted to be pushed manually over the ground to be seeded, but one which will be fully efficient and practical in its operation.

Another object of the invention is to provide a machine capable of distributing seeds evenly in uniform quantities. To secure that object, the machine includes a roller containing a plurality of shallow pockets into which seeds are released from a hopper, to be subsequently dropped from said pockets to the ground. The employment of said pockets is one of the important features of the improvement, as the quantity of seeds which is carried by an individual pocket is limited by its size. To further limit the quantity of seeds to be delivered into each individual pocket, I have devised special means which already have been described in my co-pending patent application Serial Number 416,737, filed on March 17, 1954.

I shall now describe by improvement with reference to the accompanying drawings in which:

Fig. 1 is a perspective view of the machine;

Fig. 2 is an enlarged sectional view of a part of the machine, the view including a part of a seed-containing hopper and a roller including a core which contains a plurality of seed-receiving pockets;

Fig. 3 is a sectional view on line 3—3 of Fig. 2;

Fig. 4 is a sectional view on line 4—4 of Fig. 2;

Fig. 5 is a perspective view of a roller and a core disposed therein, a part of the roller being broken off for a better display of the core;

Fig. 6 is a transverse sectional view of a roller, a core contained therein, and a casing enclosing the roller.

Similar numerals refer to similar parts throughout the several views.

The machine includes an open-top hopper 10 having a flat bottom 11, the bottom being provided with an oblong slot 12. As a whole, the hopper rests on a flat, substantially horizontal platform 13 which is in a tangential relation to a cylindrical casing 14 on the underside of said platform. A plurality of bolts 15 serve to secure the hopper to said platform.

The casing, which preferably may be made out of sheet metal, is open at both ends, its length being substantially equal to that of the hopper itself, as best shown in Fig. 2. A slot 16 in the platform 13 and in the wall of the casing therebelow is in register with the discharge slot 12 in the bottom 11 of the hopper, while another slot 17 in said casing is in a diametrically opposed relation to said slot 16 and serves as an outlet through which seeds may fall downwardly to the ground therebeneath.

Affixed to the outer surface of the casing are two prongs 18 of a fork which, in turn, is connected to a rod 19 terminating with a handle 20. Axially disposed within the casing 14, for rotation therein, is a cylindrical roller 22. The roller, which is preferably made of metal, extends from the casing at each end thereof, as best shown in Fig. 2. Mounted on one end thereof is a wheel 23, the hub portion of which is secured, by means of a key 24, to the roller for rotation therewith.

At the opposite end, the roller passes through the hub 25 of another wheel 26, the inner surface of the hub being provided with a bearing 27, as at that end the wheel is adapted to rotate freely about said roller 22. An annular flange 28 on said roller serves as a stop to prevent the wheel from moving axially in the direction of the hopper, while at the outer end of the roller cotter pins 29 prevent the wheel from sliding off said roller.

The wall of the roller which is hollow contains a plurality of circular apertures 30 which are in a spaced relation to each other and a plurality of horizontal grooves 31 in the outer surface thereof. Finally, at one end, outside the wheel 23, the wall of the roller contains a slot 32 running transversely to the length of said roller, one edge of the slot having cut therein a plurality of notches 33.

Axially disposed within the roller is a solid core 34, one end of which extends outwardly of the roller and outwardly of the wheel 23, as shown in Fig. 2, said end terminating with a disk-like head 35. At the other end the core extends to a knob 36 located within said roller, the knob serving to limit the movement of the core in that direction. Projecting radially from the core, through the slot 32, is a resilient pin 37 which is adapted to fit into one of said notches 33 in the slot 32. A recess 38 in the core permits the pin to be flexed away from the notches for a selective engagement with one of them.

The core itself, throughout that length of it which is disposed under the slot 12 of the hopper, contains a plurality of shallow, circular pockets 39, each of them being of a diameter substantially equal to that of an individual opening 30 in the wall of the roller 22. The spacing of the pockets is such that each of them is normally fully in register with an opening 30 in the wall of the roller. However, as the core is capable of being rotated within the roller, a slight turn of the core about its axis would move the pockets to a desired extent out of register with said openings in the wall of the roller. The rotary adjustment in this respect can be made by the operator of the machine by means of the head 35 of the core. Once the adjustment has been made, the core would be prevented from any further rotary movement with respect to the roller by inserting the pin 37 into a respective notch 33. The operation in this respect has been fully described by the applicant in his abovesaid application Serial Number 416,737.

While the machine is wheeled over the ground, the roller, with the core therein, rotates about its axis. As in the course of the rotation the pockets 39 come under the slots 16 and 12 within the platform and within the hopper, respectively, seeds from the hopper fall by gravity into the individual pockets and are carried therein to the slot 17 at the bottom of the casing, and through said slot drop to the ground.

The quantity of the seeds which drops from the hopper into the individual pockets is obviously limited by the size of the pockets. Additionally, however, the quantity may be restricted by decreasing the size of the openings 30 in the wall of the roller, and this may be effected by a limited turn of the core with respect to said roller, as described above.

To conclude the present specification, I wish to point out one advantage resulting from having the core provided with pockets instead of having the roller provided with diametrical passages as used in some machines. As the capacity of the pockets is limited, it does not make any difference whether the roller with the core containing said pockets rotates slowly or rapidly. In either case, the quantity of seeds falling into the pocket will be the same or substantially the same. This would not be true in cases where the core is provided with diametrical passages. In such a case, more seeds would drop to the ground through the passages during a slow rotation of the core, and less during its rapid rotation.

After having described my improvement, what I wish to claim is as follows:

1. In a seed-sowing machine including a hopper, a horizontal cylindrical casing attached to the underside of the hopper, the casing being provided at the top with a horizontal slot opening into the interior of the hopper, and a similar slot at the bottom of said casing, a hollow cylindrical roller axially disposed in the casing and extending at each end outwardly therefrom, the wall of the roller being provided along the length confined within the casing with a plurality of spaced openings, a solid cylindrical core axially disposed within the roller and having a plurality of shallow pockets in its surface, the pockets being normally in register with said openings in the wall of the roller, means to impart to the roller a limited rotary movement about its axis to bring said pockets partly out of register with said openings, and a traction wheel upon each end of the roller, at least one of said wheels being keyed to the roller to insure the rotation of the roller and the core therein with the rotation of said wheel.

2. In a seed-sowing machine including a hopper, a horizontal cylindrical casing attached to the underside of the hopper, the casing being provided at the top with a horizontal slot opening into the interior of the hopper, and a similar slot at the bottom of said casing, a hollow cylindrical roller axially disposed in the casing and extending at each end outwardly therefrom, the wall of the roller being provided along the length confined within the casing with a plurality of spaced openings, a solid cylindrical core axially disposed within the roller and having a plurality of shallow pockets in its surface, the pockets being normally in register with said openings in the wall of the roller, the core being capable of being adjusted by way of a limited rotary movement about its axis to bring said pockets partly out of register with the openings in the roller, means to retain the roller in its adjusted position, the means including a series of notches with the wall of the roller and a radial pin projecting from the core for a selective engagement with one of the notches, and a traction wheel upon each end of the roller, at least one of said wheels being keyed to the roller to insure the rotation of the roller and the core therein with the rotation of said wheel.

3. In a seed-sowing machine including a hopper, a horizontal cylindrical casing attached to the underside of the hopper, the casing being provided at the top with a horizontal slot opening into the interior of the hopper, and a similar slot at the bottom of said casing, a hollow cylindrical roller axially disposed in the casing and extending at each end outwardly therefrom, the wall of the roller being provided along the length confined within the casing with a plurality of spaced openings, a solid cylindrical core axially disposed within the roller and having a plurality of shallow pockets in its surface, the pockets being normally in register with said openings in the wall of the roller, the core being capable of being adjusted by way of a limited rotary movement about its axis to bring said pockets partly out of register with the openings in the roller, means to retain the roller in its adjusted position, and a traction wheel upon each end of the roller, at least one of said wheels being keyed to the roller to insure the rotation of the roller and the core therein with the rotation of said wheel.

References Cited in the file of this patent
UNITED STATES PATENTS

| | | |
|---|---|---|
| 2,025,821 | Nordmarken | Dec. 31, 1935 |
| 2,569,421 | Larson | Sept. 25, 1951 |